3,351,494
METHOD OF MAKING A WETPROOFED ELECTRODE
John S. Batzold, Westfield, N.J., assignor to Esso Research and Engineering Company, a corporation of Delaware
No Drawing. Filed Dec. 30, 1963, Ser. No. 334,637
7 Claims. (Cl. 136—120)

This invention relates to new and improved electrodes for use in fuel cells and other electrochemical cells. In particular, this invention relates to a new and improved electrode and the process for making same. More particularly, this invention relates to wetproofing inert materials with a silane and the method of producing such electrodes.

One problem which has faced the art with the development of fuel cells utilizing liquid electrolytes has been the production and development of an electrode which will not be flooded by the electrolyte. In order to maintain efficiency, the electrode must reject the aqueous electrolyte. A number of electrodes have been developed having varying degrees of success. Early work involved coating the pores of a porous carbon electrode with a polymer or other type of waterproofing agent. These waterproofed carbon electrodes did not prove to be very efficient. Other methods have been tried utilizing various compositions for making the electrode. Presently, the preferable methods of making waterproofed electrodes have included using tetrafluoroethylene polymer as the main hydrophobic material. The common procedure for making the hydrophobic electrodes utilizing tetrafluoroethylene polymer comprises mixing a catalyst with the tetrafluoroethylene and impressing the material onto a screen support and then heating the mixture to a temperature sufficient to cause sintering of the tetrafluoroethylene. Such electrodes had been found to be efficient when used as the anode in a cell utilizing hydrogen as the fuel. However, they are not very efficient when use as anodes in cells employing hydrocarbons or oxygenated hydrocarbons as the fuel or as the cathode when air or oxygen is the primary oxidant.

It has now been found that highly efficient electrodes for use as an anode in a fuel cell utilizing hydrocarbons or oxygenated hydrocarbons as fuels or as a cathode utilizing air or oxygen as the oxidant can be made by waterproofing substances such as asbestos, carbon, mica, silica or alumina with a halogenated alkyl silane. Electrodes made by the process of the instant invention have been found to be more efficient for use as anodes and as cathodes in fuel cells than those electrodes presently available to the art.

Substances such as asbestos and carbon have been used as components in fuel cells for a number of years. However, in the case of asbestos, it has been exceedingly difficult to utilize same as an electrode in a liquid system such as a fuel cell utilizing an aqueous acid electrolyte. The asbestos cannot be satisfactorily waterproofed by available methods by using oils, paraffin or hydrophobic polymer materials. The electrodes made with such waterproofed asbestos are inefficient. In the case of carbon, the art has tended to turn toward other materials for use in constructing electrodes. Much early work was done with carbon electrodes. However, the efficiency of such electrodes was very low, so the art has been searching for new materials from which to make electrodes. However, the instantly claimed process does allow for the use of carbon in making highly efficient electrodes.

The method of the instant invention comprises making an electrode by intimately mixing the catalyst to be used and a wetproofed base, the latter prepared by soaking a base material such as asbestos, carbon, mica or alumina in a wetproofing solution, rinsing and drying, after which the mixed catalyst/wetproofed base is pressed into a screen or membrane. This gives an electrode with substantial structure and high efficiency.

The wetproofing agents to be used in the practice of this invention are halogenated alkyl silanes such as dichlorodimethyl silane, monochlorotrimethyl silane and monochlorotriethyl silane. Monohalogenated silanes are preferred.

The electrodes of this invention can be used with the known fuel cells utilizing an aqueous electrolyte such as aqueous sulfuric acid, phosphoric acid, sodium hydroxide and potassium hydroxide.

The base materials for use in this invention include particulate materials such as asbestos, carbon, mica and alumina. The preferred base material is asbestos. The particulate base materials should have diameters within the range of from about 50 to 350 microns. Preferably, the particles should have diameters in the range of about 150 to 250 microns.

The base materials of this invention are waterproofed by soaking them in a solution of a halogenated alkyl silane. The soaked base is then rinsed and dried. The dried mixed base is then dry mixed with catalyst and pressed into an electrically conductive screen such as a Pt or Ta wire screen. The dry mix is preferably pressed into or onto the screens at a pressure of about 500 to 5000 p.s.i.g, preferably at a pressure of about 1000 to 2000 p.s.i.g.

The electrodes made by the instant process may be used as the anode in fuel cells employing hydrocarbon or an oxygenated hydrocarbon as the fuel. Any of the known hydrocarbons such as ethane, decane, hexadecane, ethylene, propane, hexene and pentene may be used as the fuel in a fuel cell. Examples of oxygenated hydrocarbons which can be used as a fuel in a fuel cell utilizing the instant electrodes would include compounds such as methanol, ethanol, glycol, ethylene glycol and propanol. The fuels when used in conjunction with the electrodes of this process may be used either in liquid or vapor form.

The catalyst materials to be used in conjunction with the instantly claimed process may be any of the known catalysts such as Group VIII metals, alloys and mixtures of Group VIII metals and alloys and mixtures of Group VIII metals and Group VIIB metals. The noble metals such as platinum, gold, silver, osmium and iridium may be used as the catalyst in conjunction with the electrodes made by the instant process. It is obvious to one skilled in the art that the selection of the catalyst will depend primarily upon two things; one, the electrolyte to be used, in that the catalyst must be stable in an electrolyte and two, the particular fuel which is being oxidized.

Electrodes prepared by the instantly claimed process can be used as the cathode in fuel cells. The cathode of a fuel cell is essentially independent from the particular fuel being oxidized at the anode. Therefore, the particular catalyst and electrode used as the cathode is not dependent upon the particular fuel being oxidized at the anode. The instant electrode when used as a cathode is very efficient when used in a fuel cell utilizing oxygen or an oxygen-containing gas such as air as the oxidant. The catalyst used in the preparation of the cathode made by the instant process can be any of the known oxygen catalysts such as gold, platinum-iridium or platinum.

In order to further particularly describe the instant invention, the following examples are offered for the purposes of clarity and are not to be construed as limitations upon the scope of the invention as set forth in the appended claims.

EXAMPLE 1

In order to test the efficiency of electrodes made by the instant process, an electrode was made by mixing powdered platinum with powdered asbestos which was treated with a solution of dichlorodimethyl silane in benzene as follows: Powdered asbestos was soaked in a 10 vol. percent dichlorodimethyl silane solution in benzene for 2 hours. The saturated asbestos was then rinsed with benzene, dried, mixed with catalyst and pressed onto an 80 mesh platinum screen. The electrode was then tested for performance as an anode in a half cell utilizing ethane as the fuel and 30 wt. percent sulfuric acid as the electrolyte. The cell was operated at about 100° C. In order to test the efficiency of our electrode, a conventional platinum tetrafluoroethylene electrode was utilized in a duplicate half cell employing ethane as the fuel and 30 wt. percent sulfuric acid as the electrolyte which was operated at 100° C. The conventional platinum tetrafluoroethylene electrode was made by intimately mixing platinum and tetrafluoroethylene and pressing onto a platinum screen. The results of the test are set forth in Table I below.

TABLE I

|  | Polarization from Ethane Theory at Indicated Amps./Ft.$^2$ | | | | |
|---|---|---|---|---|---|
|  | 1 | 5 | 10 | 20 | 30 |
| Conventional: | | | | | |
| Pt/tetrafluoro-ethylene | 0.18 | 0.26 | 0.31 | ------ | ------ |
| Pt/asbestos | 0.165 | 0.215 | 0.24 | 0.29 | 0.37 |

It will be noted that the conventional electrode failed before reaching 20 amps./ft.$^2$ of current.

EXAMPLE 2

An electrode prepared in accordance with the procedure set forth in Example 1 was tested as the cathode in a fuel cell half cell employing air as the oxidant, 30 wt. percent sulfuric acid as the electrolyte and operated at 60° C. In an identical cell, a conventional platinum tetrafluoroethylene electrode was employed to form a basis of comparison between the electrodes available to the art and the electrode of the instant invention. The conventional platinum tetrafluoroethylene electrode was polarized at about 50 millivolts at 100 amps./ft.$^2$ of current. The electrode prepared in accordance with the instant process was polarized up to about 42 millivolts at 100 amps./ft.$^2$. When the oxidant in this cell was changed to oxygen, the electrode only polarized about 0.44 volt at a current density of 500 ma./cm.$^2$. This indicates that the instantly claimed electrode is more efficient than the electrodes presently available to the art.

EXAMPLE 3

Three electrodes were made in order to indicate the necessity that all the base material must be waterproofed. All three electrodes were made by dry mixing the base material with finely divided Pt and pressed onto a Pt screen. The electrodes were tested as the anodes in a cell employing ethane as the fuel, 30 wt. percent sulfuric acid as the electrolyte and operated at about 100° C. The waterproofed base portions were made by soaking finely divided asbestos in a benzene solution of monochlorotrimethyl silane, rinsing and then drying. The nonwetproofed base was finely divided asbestos. The base portion comprised (a) 100% wetproofed asbestos, (b) 75% wetproofed and 25% nonwetproofed asbestos, and (c) 50% wetproofed and 50% nonwetproofed asbestos. The results of the tests are set forth in Table II.

TABLE II

| Percent Wetproofed Asbestos | Polarization from Theoretical Ethane at Indicated ma./cm.$^2$ | | | | |
|---|---|---|---|---|---|
|  | 0 | 1 | 10 | 20 | 30 |
| 100 | 0.12 | 0.195 | 0.28 | 0.36 | 0.49 |
| 75 | 0.12 | ------ | *0.295 | ------ | ------ |
| 50 | 0.08 | ------ | *0.30 | ------ | ------ |

*Failed before reaching 20 ma./cm.$^2$

The data clearly show the totally wetproofed base comprising electrode to be superior.

EXAMPLE 4

Two electrodes were prepared in accordance with the process of the instant invention. The electrodes were prepared by mixing finely divided asbestos with a benzene solution of monochlorodimethyl silane then rinsed and dried. The wetproofed asbestos was then divided into two parts. The first part was dry mixed with finely divided Pt-Ir catalyst and then pressed into a 50 mesh tantalum screen. The second part was dry mixed with finely divided gold and then pressed onto a 50 mesh tantalum screen. The first electrode was utilized as the anode in a fuel cell employing decane as the fuel and 30 wt. percent sulfuric acid as the electrolyte. The second electrode was used as the cathode. The cell was operated at about 100° C. Air was the oxidant. The cell produced current thereby showing that the electrodes of the instant invention could be utilized as both the anode and cathode in a fuel cell.

What is claimed is:
1. A method of making a wetproofed electrode which comprises the steps of:
   (a) wetproofing an inert particulate base material selected from the group consisting of asbestos, carbon, mica, silica, and alumina by contacting said material with a solution of a halogenated alkyl silane,
   (b) rinsing and drying said wetproofed inert particulate base material prepared in step (a),
   (c) dry mixing the composition prepared in step (b) with a finely divided catalyst, and
   (d) pressing the mixture prepared in step (c) onto an electrically conductive support.
2. A method as defined by claim 1 wherein said inert particulate based material is asbestos.
3. A method as defined by claim 1 wherein said finely divided catalyst is Pt-Ir.
4. A method as defined by claim 1 wherein said halogenated alkyl silane is monochlorotrimethyl silane.
5. A method as defined by claim 1 wherein the diameters of the inert particulate base material employed in step (a) are in the range of about 50 to 350 microns.
6. A method as defined by claim 1 wherein said electrically conductive support is a Pt screen.
7. A method of making a wetproofed electrode which comprises the steps of:
   (a) wetproofing particulate asbestos having diameters in the range of about 50 to 350 microns by contacting said particulate asbestos with a benzene solution of monochlorotrimethyl silane,
   (b) rinsing and drying said wetproofed particulate asbestos,
   (c) dry mixing the composition prepared in step (b) with finely divided Pt, and

(d) pressing the composition prepared in step (c) onto a Pt screen.

References Cited

UNITED STATES PATENTS

| | | | |
|---|---|---|---|
| 2,678,343 | 5/1954 | Daniel | 136—120 |
| 3,088,990 | 5/1963 | Rightmire et al. | 136—86 |
| 3,098,762 | 7/1963 | Roblee et al. | 136—120 |
| 3,117,034 | 1/1964 | Tirrel | 136—86 |

WINSTON A. DOUGLAS, *Primary Examiner.*

N. P. BULLOCH, O. F. CRUTCHFIELD,
*Assistant Examiners.*